United States Patent Office 3,681,021
Patented Aug. 1, 1972

3,681,021
PRODUCTION OF HEAVY WATER EMPLOYING A GROUP VIII CATALYST
Richard J. Mikovsky, Trenton, and Sundaresa Srinivasan, Princeton, N.J., assignors to Mobil Oil Corporation
No Drawing. Filed Mar. 31, 1970, Ser. No. 24,324
Int. Cl. B01j *11/00;* C01b *4/00, 5/02*
U.S. Cl. 23—204 C            8 Claims

ABSTRACT OF THE DISCLOSURE

Heavy water is produced in a liquid-gas-solid reaction system employing a catalyst comprising a Group VIII metal on a resin support.

BACKGROUND OF THE INVENTION

(I) Field of the invention

This invention relates to the production of heavy water and, in one of its aspects, relates more particularly to an improved process for the production of heavy water in which the deficiencies encountered in the present exchange reactions of hydrogen with the deuterium of heavy water are successfully overcome.

(II) Description of the prior art

Present day plants for the production of heavy water employ homogeneous exchange of deuterium between gas and liquid phases. Such plants must necessarily be operated at relatively high temperatures (e.g. on the order of about 140° C.) in order to obtain acceptable rates of reaction. Under such conditions problems of corrosion and separation are encountered. In an effort to overcome these problems, research with heterogeneous systems has been conducted and has been directed toward the use of relatively lower reaction temperatures (for example on the order of about 25–30° C.) where a more favorable equilibrium is available, thus seeking the possible elimination of corrosion and separation problems. In such instances however it has been found that the catalyst normally employed, for example platinum-carbon or nickel-chromia, tend to undergo degradation in the aqueous system over prolonged use. In this respect, the criticality of employing effective solid catalysts for the aforementioned production of heavy water in a liquid-gas-solid reaction system is succinctly stated by Benedict and Pigford [1] that ". . . nothing would improve prospects for the dual temperature steam-hydrogen exchange process more than the discovery of such a catalyst."

SUMMARY OF THE INVENTION

In accordance with the present invention, as more fully fully hereinafter described, an improved process for the production of heavy water is provided, by employing a liquid-gas-solid reaction system, in which a catalyst, comprising a Group VIII metal on a resin support is utilized. In general, the improved process is concerned, qualitatively, with the use of these catalysts to concentrate deuterium in available sources of hydrogen or water. In essence, it has been found that these catalysts are effective in the exchange of hydrogen with the deuterium of heavy water, tending to overcome corrosion and separation problems accompanying previously proposed heterogeneous systems for the production of heavy water. More specifically, the invention is concerned with a process for the production of heavy water wherein a mixture comprising water and hydrogen is subjected to isotopic exchange with each other in the presence of the aforementioned catalyst comprising a Group VIII metal on a resin support to effect

[1] Benedict and Pigford: "Nuclear Chemical Engineering," McGraw-Hill, 1951 (page 459).

the concentration of deuterium in the water-like molecule or in the hydrogen-like molecule.

The process of the present invention involves a reaction which may be illustrated as follows:

$$HD + H_2O \rightleftharpoons HDO + H_2$$

In this reversible reaction, deuterium can be preferentially concentrated in the water-like or hydrogen-like molecules in the presence of a solid or heterogeneous catalyst to product heavy water. Each of these reactions is well known. In accordance with the present invention however, it is found that the aforementioned catalysts will catalyze both reactions successfully, i.e., the removal of deuterium from hydrogen with water or the removal of heavy water from natural water with hydrogen.

In essence, the equilibrium achieved by the aforementioned general reaction is the sum of two equilibria, viz.

$$H_2 + D_2O \rightleftharpoons HD + HDO$$

and $$H_2 + D_2O \rightleftharpoons D_2 + H_2O$$

in practical application, the first of the above-illustrated two reactions is of primary significance.

With reference to deuterium, the production of heavy water (deuterium oxide, $D_2O$) and of particular use as a neutron moderator in nuclear operations, reference is had to the production of heavy water of high isotopic and chemical purity, by separation from natural water. As herein employed the term "deuterium" is intended to denote one of the three known isotopes of hydrogen. In this respect, natural water, other hydrogen-containing compounds and conventional hydrogen gas contain mainly the isotope having an atomic weight of 1.0. Deuterium, the second isotope, has an atomic weight of 2.0, while tritium, the third isotope, has an atomic weight of 3.0. In accordance with the usual rule regarding isotopes, these three types of atoms share the same atomic number, 1, and have nearly identical chemical properties. As herein employed, and in accordance with general chemical usuage, the term "hydrogen" is meant to denote the naturally occurring mixture of isotopes of this element, while "water" is meant to denote the mixed oxides of the element. With regard to separation of the isotopic forms, the term "hydrogen" is generally assigned to the most abundant isotope having the atomic weight 1.0. "Protium" has been proposed as a specific name for this isotope but has not achieved generally wide acceptance. The term "light water" is applied to the oxide of the light isotope having a molecular weight of 18, and "heavy water" is applied to deuterium oxide, having a molecular weight of 20.

Heavy water is principally employed as a moderator in nuclear reactors, as hereinbefore indicated. Its value as a moderator resides in the superior ability of deuterium atoms to absorb energy from neutrons which collide with them, without at the same time capturing or uniting with too many of these neutrons. In the form of heavy water, the attractive nuclear properties of deuterium are provided in a convenient physical and chemical state.

About 0.01 mol percent of the hydrogen in natural water is deuterium which, at this low concentration, exists in solution as HDO. The ratio of deuterium to hydrogen varies only slightly among the many sources of the element and its compounds. Tritium is a radioactive isotope of hydrogen and occurs naturally only in extremely small concentrations. In general, the process of the present invention, employing the aforementioned Group VII metal catalyst on a resin support, may be applied to various known methods for the separation of heavy water.

In its more specific aspects, the process of the present invention can be described in the form of a series of equations depicting the exchange of hydrogen and deuterium between hydrogen-like and water-like molecules (each reaction having its own equilibrium constant), e.g., $$HD + H_2O \rightleftharpoons H_2 + HDO \quad K_1$$
$$HD + HDO \rightleftharpoons H_2 + D_2O \quad K_2$$
$$D_2 + H_2O \rightleftharpoons H_2 + D_2O \quad K_3$$
$$D_2 + HDO \rightleftharpoons HD + H_2O \quad K_4$$

In any specific instance the hydrogen-like molecules will contain $H_2$, HD and $D_2$, while water-like molecules will contain $H_2O$, HDO and $D_2O$. It will be noted however that their individual concentrations will depend on the total deuterium-hydrogen balance in the system so that more than one of the aforementioned equations will be necessary together with the appropriate combination of the equilibrium constants to describe the reaction. It is arbitrary, therefore, under what conditions (deuterium level) the catalyst is subjected to a test, inasmuch as equations can be combined to describe the results. In general, the purpose is to concentrate deuterium in the water phase from a natural abundance (0.015%) to about 2.5%. Under such conditions, (viz. dilute deuterium concentrations) the deuterium will be present in the hydrogen-like molecules as HD, and in the water-like molecules as HDO. Therefore, there need only be considered the reaction $$HD + H_2O \rightleftharpoons H_2 + HDO$$

Here also the efficacy of a specific catalyst can be tested by any of the above-described reactions or any combination of such reactions.

In order to obtain the desired concentrations, advantage can be taken of the temperature coefficient of the equilibrium constant. This relationship may be expressed as follows:

$$K_1 = \frac{[HDO][H_2]}{[H_2O][HD]} = 3.5 \text{ at } 30° \text{ C. and } 2.3 \text{ at } 150° \text{ C.}$$

In essence, therefore, it will be seen that the lower the temperature the more preference is shown by the deuterium for the water-like molecules. Thus, there can be provided a stage process (comprising, for example, from about 8 to about 16 stages) each stage containing a low temperature:high temperature equilibration. In each stage there is provided a close circulation of hydrogen-like molecules contacting the water-like molecules. Thus, in a given stage a low temperature reactor is provided in which fresh water, or water obtained from a previous stage, may be subjected to a temperature within the range for example, from about 20 to about 35° C. Water removed from this reactor may then be transferred to a relatively high temperature reactor in this stage in which it is subjected to temperatures of about 80 to 200° C. From this reactor depleted water may be returned to a proceeding stage, or may be handled as waste. A portion of the product transferred from the low temperature reactor to the high temperature reactor may be taken off as a bleed of enriched water for repetitive use in a succeeding stage. Catalyst material comprising a Group VIII metal on a resin support is provided in each reactor.

In accordance with the process of the invention, water entering a specific stage contacts the hydrogen-like molecules at the low temperature and essentially picks-up a calculable amount of deuterium in the enrichment stage. Some of this enriched water, as indicated above, is fed to the next stage, while the remainder proceeds to the high temperature reaction and again contacts the hydrogen-like molecules, losing a quantity of deuterium to them. In the steady-state this deuterium lost to the hydrogen-like molecules equals the deuterium gained from the hydrogen-like molecules in the low temperature reactor. The closed stream of hydrogen-like molecules alternatively gives up and accepts deuterium, and again, in the steady-state maintains a calculable deuterium concentration gradient. This same procedure can be applied to the enrichment of deuterium in hydrogen.

The catalyst employed in the reactions in the liquid-gas-solid reaction system, as previously indicated, comprises a Group VIII metal on a resin support. In general, in order to prepare the supported metal catalysts, a porous ion exchange resin in particulate form is treated with a solution of the metal compound to form a complex comprising said resin having the metal compound moiety chemically bonded thereto. Then the complex is treated with a reducing agent to reduce the metal of the metal compound moiety to a lower-valent state, preferably to zero-valent metal. Depending on the complex, the moiety may be chemically bonded to the resin by coordinate covalent bonds, as is preferred, or by ionic bonds. Depending on the depth of penetration of the metal compound in the resin particles, the resulting material may have lower-valent or zero-valent metal disposed as a shell of varying thickness adjacent the exterior boundary of the particles or the metal may be substantially uniformly dispersed throughout the particles.

The porous ion exchange resin which is used to prepare the catalyst material contains functional groups, i.e., acid groups in the case of a cation exchange resin and basic groups in the case of anion exchange resin, and these groups, of course, are chemically bonded to the resin or resin matrix. Cation exchange resins contain such acidic functional groups as sulfonic acid, phenolsulfonic acid, phenol, phosphonic acid, carboxylic acid, etc. These acidic groups may also be in salt form. Anion exchange resins contain such basic groups as primary, secondary, or tertiary amines, or quaternary ammonium hydroxide groups, and these may be associated with aliphatic, aromatic, heterocyclic, or cycloalkane amine compounds. Also groups like trimethylbenzylammonium, 2-hydroxyethyl dimethylbenzylammonium, and N-benzylpyridinium. Also quarternary phosphonium or tertiary sulfornium groups in which the substituents on the phosphorus or sulfur atoms may be alkyl, aromatic, heterocyclic, cycloalkyl, alkoxy, aryloxy, or mixtures thereof; for example, methyl tri (4-methoxyphenyl) phosphonium groups or triphenyl sulfonium groups. Other basic groups include diamines, triamines, and alkanolamines; also amine groups as in alpha, alpha'-dipyradyl; and groups as in guanidine and dicyandimidine. Many of these basic groups may also be in salt form. In the case of resin complexes having coordinate cavolent bonds, resins may be used having basic functional groups like the following: nitrile, cyanate, isocyanate, thiocyanate, isothiocyanate, isocyanide, and other organic nitrogen-containing groups; also sulfide, phosphine, arsine, stibine, ketones, diketones, substituted ketones, etc. These ion exchange resins are generally made by subjecting to appropriate chemical treatment a desired copolymer base material or matrix; for example, a styrene-divinylbenzene copolymer may be converted to a sulfonic acid cation exchange resin by sulfonation; or the resins may be made by reacting all ingredients together, thus a cation exchange resin of phenolic type can be prepared by reacting a phenol, an aldehyde, and a sulfonic acid. Illustrative ion exchange resins for making the complexes include sulfonated copolymers of styrene and a divinylaromatic, phenolic methylene sulfonic acid resins, sulfonated coal, styrene-divinylbenzene copolymer containing dimethylaminomethyl groups, polystyrene sulfonic acid resins, cross-linked polyvinyl pyridine, a copolymerized mixture of phenol, formaldehyde, and triethylenetetramine, hydrolyzed styrene-divinylbenzene copolymers incorporating maleic anhydride, polyacrylic acid resins, chloromethylated styrene-divinylbenzene copolymer treated with trimethylamine, melamine-guanidine-formaldehyde polymers, urea-formaldehyde-triethanolamine resins, polyalkylene-polyamine-formaldehyde resins, etc. Ion exchange celluloses are suitable. Preferably the resin is in particulate form, such as beads, of any desired particle size; a conventional and illustrative size is 20 to 40 or 50 mesh. As indicated, these resins are porous, generally exhibiting a surface area of about 20 to 200 sq. m./g., although this range may be extended. It is possible to use a non-porous resin if it is one that undergoes swelling on contact with the solution of metal compound as swelling induces porosity in the resin particles.

In order to form a resin complex in which the metal compound moiety is bonded to the resin by coordinate covalent bonds, the starting resin is an anion exchange resin having basic functional groups. It is treated with a Group VIII metal compound comprising a soluble coordination compound having anionic or neutral ligands, or both, with anionic ligands preferred. Thus, the metal of the metal compound may be selected from iron, cobalt, nickel, ruthenium, rhodium, palladium, platinum, osmium, and iridium. Metals of the platinum series are preferred, i.e., ruthenium, rhodium, palladium, platinum, osmium, and iridium. Suitable specific anionic ligands include chloride, bromide, iodide, cyanide, nitrate, acetate, sulfide, and the like; suitable neutral ligands include water, ammonia, amine, phosphine, carbon monoxide, olefins, diolefins and the like. Some representative metal compounds are rhodium trichloride trihydrate, dichlorobis (triphenylphosphine) cobalt (II), dichlorotetrabis(triphenylphosphine)ruthenium (II), bis(benzonitrile)dichloropalladium (II), tetra(pyridine)platinum (II) tetrabromoplatinate, iodocarbonylbis (triphenylphosphine) iridium (I), tetraamminepalladium (II) chloride, pentacarbonyliron (O), di-mu-chloro-dichlorobis (triethylarsine) diplatinum (II), and the like. The resulting insoluble resin complex comprises an insoluble anion exchange resin containing basic functional groups; to some of these groups there is bonded, by coordinate covalent bonds, a metal atom from the foregoing list, and each such metal atom has chemically bonded thereto at least one ligand. In other words, the functional group of the resin replaces one or more ligands of the metal compound, the reaction involved being described as a ligand exchange. The metal may comprise .1 or 1 to 50%, preferably 1 to 10%, of the complex; the ligand may comprise 0 to 60%, preferably 0.1 to 25%, and more preferably 2 to 10% thereof; and the resin may comprise the balance, or about 39 to 99%, weight basis.

The resin complex is then treated with a reducing agent to reduce the metal of the metal compound moiety to a lower-valent state, preferably to zero-valent state. Such agent may be any suitable compound capable of effecting the described step, including hydrazine, substituted hydrazine, hydroxylamine, silanes, chlorinated silanes, alcohols, boranes, metal hydrides, a mercurous compound, stannous compound, cuprous compound, or a formate, hydrosulfite, or hypophosphite. Other agents include hydroquinone, ferrous oxalate, p-phenylenediamine, p-aminophenol, catechol, pyrogallol, and the like.

It will be understood that the choice of metal compound may influence the choice of the reducing agent. For example, platinum compounds work well with reducing agents like hydrazine and formates. With iron compounds it is preferred not to use an agent like hydroxylamine; and with iron, cobalt, and nickel compounds it is preferred not to use formates. Hydrazine is generally useful for most metal compounds. A simple test is sufficient to indicate the choice of reducing agent with any particular metal compound.

To prepare the catalyst material, the selected anion exchange resin is treated with the desired metal compound over a period of time ranging from a few seconds to several hours at a temperature ranging from room to refluxing. The metal compound is first dissolved in a suitable solvent, which for ionic metal compounds is preferably a polar solvent and for neutral metal compounds is preferably a non-polar solvent. Useful polar solvents include water, alcohols, sulfones, dimethylsulfoxide, acetonitrile, and various ketones like acetone. Non-polar solvents include hydrocarbons, ethers, halogenated hydrocarbons, and the like. The resulting resin complex is then treated with the reducing agent at a temperature which is generally room temperature but which may range to about 100° C. or to refluxing. The agent may be in vapor or liquid form; in the latter case it is either a liquid agent or, if a solid, in solution in a solvent which may be an ionizing compound like water and various low molecular weight alcohols or a non-ionizing compound like a hydrocarbon, halogenated hydrocarbon, or an ether. The time of contact is variable, depending on the type of metal deposition desired on the resin particles, i.e., shells of varying depth or a complete uniform deposition throughout the particles. Generally, to obtain shell deposition, the contact time is of the order of minutes, while for complete uniform deposition the time is of the order of several hours. On contact with the reducing agent, the metal compound is reduced at the site of such agent, producing either lower-valent metal compound or zero-valent metal, depending on the desired extent of reduction. It is considered that the dispersion of the reduced metal moiety in the resin is exceedingly fine; when the reduction is to zero-valent, the latter is believed to be, at least initially, monoatomically dispersed in the resin; and when the reduction is to lower-valent metal compound moiety, the reduced species is molecularly dispersed.

Following reduction, the resin particles are suitably washed and dried.

It is found that with a reducing agent like hydrazine, shell type deposition usually takes place when the hydrazine contact time is short, the temperature is room temperature and a non-polar solvent like chloroform, benzene, ether, etc., is used for the hydrazine. Deposition in depth is obtained by using a long hydrazine contact time, a higher temperature going up to refluxing, and an ionizing solvent like water or an alcohol for the hydrazine. These conditions and results generally apply to other agents like substituted hydrazine, formates, and non-salt agents, i.e., those which are neutral with respect to charge. It may be noted at this point that the degree, and the nature, of the dispersion of metal particles in the resin may also be controlled in the step of dispersing the metal compound, prior to reduction, in and on the resin.

Not only may the degree of dispersion of metal particles in the resin be controlled, but also the amount of metal, which may range from 0.01 or 0.1% to 1, 5, 10% or more, and even up to 50% or more, weight basis. Of particular significance from an economic view is the fact that there is no waste of metal; during the deposition step, metal deposits only on or in the resin and not in the exterior solution.

Considering now the preparation of a resin complex in which the metal compound moiety is bonded to the resin by ionic bonds, the resin is treated with a metal compound which is capable of forming a complex ion containing a metal and two or more ligands. When the resin is a cation exchange resin, the metal compound is one able to form a complex cation having a net positive charge; and when the resin is an anion exchange resin, the metal compound is one able to form a complex anion having a net negative charge. The ligands of the complex ion may be neutral or anionic or mixed, and may include those already described. Representative metal compounds able to form the described complex cations include tetraammineplatinum (II) dichloride, hexaamminecobalt (III) chloride sulfate, tetra(triphenylphosphine)palladium (II) dibromide, hexa(methylamino) rhodium (III) trinitrate, bis(cyclopentadienyl)iron (III) chloride, azidopentaamminecobalt (III) sulfate, and the like. Illustrative metal compounds able to form the described complex anions include potassium tetrachloropalladite, potassium nitridopentachloroosmate (VI), potassium hexafluoroniccolate (IV), potassium oxotetrafluorochromate (V), potassium trichloromonoethyleneplatinate (II), potassium tetranitroplatinate (II), and the like. The resulting insoluble resin complex comprises an insoluble ion exchange resin containing functional groups and having the said complex ion ionically bonded thereto. The metal may comprise one from the last-mentioned list of metals. In the complex, the metal may comprise 0.1 to 50%, preferably 1 to 10%; the ligand may comprise 0 to 60%, preferably 0.1 to 25%, and more preferably 2 to 10%; and the resin about 39 to 99%, weight basis.

The resin complex just described is treated with a reducing agent of the type described above, using the same conditions, to reduce the metal of the metal compound moiety to a lower-valent state, preferably to zero-valent state. As before, shell type metal deposition is possible as well as uniform deposition throughout the resin complex particles.

DESCRIPTION OF SPECIFIC EMBODIMENTS

The preparation of the catalyst employed in the process of the present invention may be illustrated by the following examples illustrative of resin-metal catalysts derived from resin complexes containing a metal compound moiety chemically bonded to a resin.

EXAMPLE 1

A solution of 5 g. tetraamminepalladium (II) chloride in 300 ml. distilled water is added to 140 ml. moist Amberlyst-15 beads of 30 to 40 mesh and the mixture stirred 70 hours at room temperature. (Amberlyst-15 is a cation exchange resin comprising a styrene-divinylbenzene copolymer containing sulfonic acid groups.) The solids are filtered and washed with distilled water and with ethanol, and then dried at 110° C. for 2 hours. About 62.4 g. of resin containing $Pd^{+2}$ is obtained. Of this material, 10 g. are stirred with 100 ml. of a 22% aqueous hydrazine solution at 50° C. for 35 minutes. The reduced resin containing metallic palladium is filtered and washed with water. The hydrogen form of this material is regenerated by treating it with 300 ml. of 6 N HCl solution, then with 1000 ml. of 2 N HCl solution, washing until the washings are free of chloride, then washing with 500 ml. absolute ethanol and 250 ml. ether. The material now contains both zero-valent palladium and sulfonic acid groups. It is dried at 110° C. for 2 hours. The resulting catalyst material has the palladium metal substantially uniformly dispersed through the resin beads.

In a similar manner, any of the other above-described catalysts, comprising Group VIII metals on a resin support, may also be prepared.

EXAMPLE 2

This example will serve to illustrate how deuterium may be concentrated in the water phase, as hereinbefore disclosed.

The process may be carried out in one-stage or a multistage cascade. Each stage contains high and low temperature reactors and a closed loop of hydrogen. One mole of water (HDO mole fraction=$X_f$) is fed to the low temperature reactor which is maintained, in general, at a temperature from about 0 to about 35° C., and preferably from about 20 to about 30° C., and contacted with one mole of hydrogen (HD mole fraction=$.44X_f$) of the closed loop. After an equilibrium is established, for example, at 25° C., the water has an HDO mole fraction of $1.127X_f$ and the hydrogen contains $0.313X_f$ mole fraction HD.

The enriched water stream is split into 0.5 mole going to the next stage and 0.5 mole diverted into the high temperature reactor, which is maintained at a temperature, in general, from about 100 to about 600° C. and preferably from about 150 to 300° C., where it contacts one mole of hydrogen from the low temperature reactor. After equilibrium is established, for example, at 200° C., the water is depleted to an HDO mole fraction of $0.895X_f$ and is rejected to waste or diverted to the previous stage. The hydrogen has simultaneously increased its HD content to $0.44X_f$ mole fraction and completes the closed cycle on introduction into the low-temperature reactor.

The net effect in this stage is the production of 0.5 mole of enriched water ($1.127X_f$ mole fraction HDO) and 0.5 mole of depleted water ($0.895X_f$ mole fraction HDO) from one mole of feed water ($X_f$ mole fraction HDO). Each reactor is provided with the catalyst prepared in accordance with Example 1.

EXAMPLE 3

This example will serve to illustrate how deuterium may be concentrated in the hydrogen phase, as hereinbefore disclosed, employing a stage process. This procedure differs from that of Example 2 in that the aforementioned closed loop contains water.

One mole of feed hydrogen ($X_f$ mole fraction HD) is contacted in the high temperature reactor, (within the aforementioned range of temperature conditions disclosed for this reactor) with one mole of water ($2.72X_f$ mole fraction HDO). After equilibrium is established, for example, at 200° C., the effluent is found to comprise one mole of enriched hydrogen ($1.248X_f$ mole fraction HD) and one mole of water ($2.474X_f$ mole fraction HDO). 0.5 mole of the enriched hydrogen is then fed to the next stage and 0.5 mole is fed to the low temperature reactor (within the aforementioned range of temperature conditions disclosed for this reactor) where it contacts one mole of the depleted water in the closed loop.

Equilibration in the low temperature reactor, for example, at 25° C., leads to 0.5 mole of depleted hydrogen ($.75X_f$ mole fraction HD) where it is rejected or fed to the previous stage. At the same time the mole of depleted water is restored to $2.78X_f$ mole fraction HDO and is then led again to the high temperature reactor, thereby completing the cycle.

The net effect has been to produce 0.5 mole of enriched hydrogen ($1.248X_f$) and 0.5 mole of depleted hydrogen ($0.75X_f$) from one mole of feed hydrogen ($X_f$).

While preferred embodiments of the novel process of the present invention have been described for the purposes of illustration, it will be understood that various modifications and adaptations thereof, which will be obvious to those skilled in the art, may be made without departing from the spirit of the invention.

We claim:

1. A method for the production of heavy water which comprises subjecting a mixture of water and hydrogen to isotopic exchange with each other at a temperature from about 0° C. to about 600° C. in the presence of a catalyst comprising a Group VIII metal on a porous ion-exchange resin support to effect transfer of deuterium from hydrogen to water, and recovering the thus-enriched heavy water.

2. A method in accordance with claim 1 wherein said transfer is carried out at a temperature from about 0° C. to about 35° C.

3. A method in accordance with claim 1 wherein said transfer is carried out at a temperature from about 20° C. to about 30° C.

4. A method in accordance with claim 1 wherein said transfer is carried out at a temperature from about 100° C. to about 600° C.

5. A method in accordance with claim 1 wherein said transfer is carried out at a temperature from about 150° C. to about 300° C.

6. A method in accordance with claim 1 wherein said catalyst comprises palladium on a porous ion-exchange resin support.

7. A method in accordance with claim 1 wherein said catalyst comprises platinum on a porous ion-exchange resin support.

8. A method in accordance with claim 1 wherein said porous ion-exchange resin comprises a porous cation exchange resin comprising a styrene-divinylbenzene copolymer having sulfonic acid groups.

References Cited

UNITED STATES PATENTS 2,726,141  12/1955  Appell _____ 23—152

FOREIGN PATENTS 800,730  9/1958  Great Britain _____ 23—204 R

OSCAR R. VERTIZ, Primary Examiner

H. S. MILLER, Assistant Examiner

U.S. Cl. X.R.

23—210; 252—426